(No Model.)
R. L. DORSEY.
CASTER.
No. 604,520. Patented May 24, 1898.
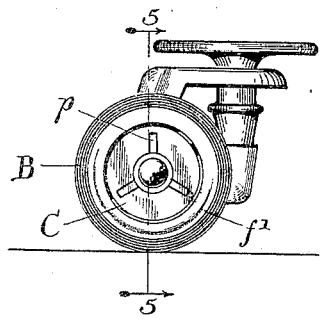
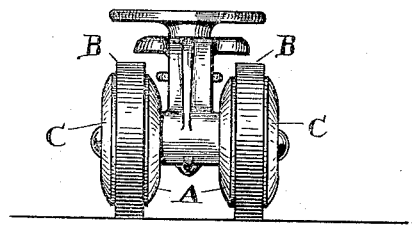
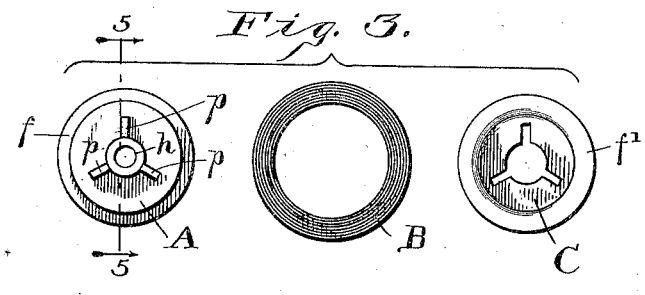
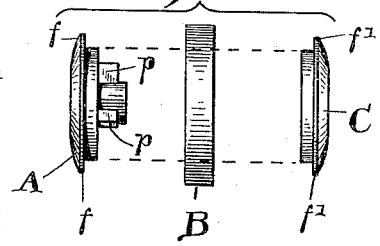
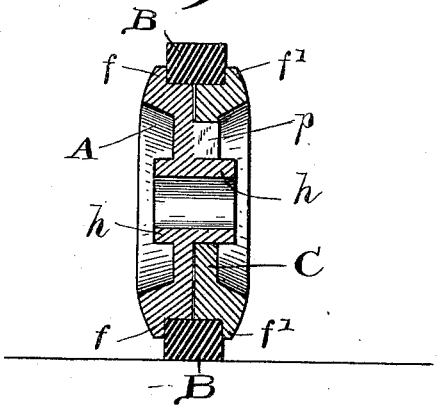
WITNESSES:
F. W. Woerner.
J. A. Walsh.
INVENTOR
Robert L. Dorsey,
BY
Chester Bradford,
ATTORNEY.

United States Patent Office.

ROBERT L. DORSEY, OF INDIANAPOLIS, INDIANA, ASSIGNOR TO THE TUCKER & DORSEY MANUFACTURING COMPANY, OF SAME PLACE.

CASTER.

SPECIFICATION forming part of Letters Patent No. 604,520, dated May 24, 1898.

Application filed November 18, 1897. Serial No. 659,037. (No model.)

*To all whom it may concern:*

Be it known that I, ROBERT L. DORSEY, a citizen of the United States, residing at Indianapolis, in the county of Marion and State of Indiana, have invented certain new and useful Improvements in Casters, of which the following is a specification.

The principal object of my present invention is to produce a simple, durable, and inexpensive caster with rubber-tired wheels.

It consists in a certain peculiar construction and arrangement of the wheel parts whereby accurate fitting and strong and durable construction may be secured without requiring any machine-work or fitting preparatory to the assembling of the parts, all as will be hereinafter more particularly described and claimed.

Referring to the accompanying drawings, which are made a part hereof and on which similar letters of reference indicate similar parts, Figure 1 is a side elevation of a caster provided with wheels embodying my present invention; Fig. 2, a front elevation of such a caster; Fig. 3, a side elevation of the three parts constituting a caster-wheel separate from each other; Fig. 4, an edge elevation of the parts shown in Fig. 3; and Fig. 5, a sectional view of a caster-wheel, on a considerably enlarged scale, as seen when looking in the direction indicated by the arrows from the dotted line 5 5.

As the present invention relates solely to the wheels, the other portions will not be particularly described herein and are shown merely for purposes of illustration, so that the appearance of a complete caster embodying my invention may be seen.

Each of the wheels consists of three parts A, B, and C.

The part A constitutes one side plate to the wheel. It embodies the hub $h$ and flange $f$ at the edge or rim and also projections $p$, which are preferably three in number and arranged radially to the hub, as shown.

The part B is merely a rubber tire of suitable size and form to be carried by the parts B and C between the flanges $f f'$ at the edges thereof, and is of sufficient size to project beyond said flanges and form the extreme peripheral surface of a complete wheel.

The part C constitutes one side plate to the wheel. It embodies a flange $f'$ at the edge or rim and is provided with a central opening, through which the hub portion $h$ of the part A passes, and also with openings to receive the projections $p$ on said part A. Where said projections $p$ are formed radial to the hub, the slits in the part C are correspondingly radial to the central opening thereon, as shown.

A caster-wheel constructed in accordance with my invention requires no machine-work to fit it for assembling, and the only machine-work required in completing the wheel is that of drilling or reaming the axle-hole through the hub. In assembling, the rim B is first placed upon the part A and the part C is then placed over the part B, clamping it between the two parts A and C. The projections $p$ on the part A extend through the corresponding openings in the part C. The whole is then strongly secured together by merely heading down the ends of said projections, when the wheel is complete, ready to be placed upon the axle of the caster. I thus produce a very strong, rigid, and durable wheel and at a mere fraction of the cost incident to the production of wheels into which machine-work must enter, as where screw-threading, drilling, bolting, and such like methods are employed.

Having thus fully described my said invention, what I claim as new, and desire to secure by Letters Patent, is—

The combination, in a wheel, of the part A having a hub and projections $p$ integral therewith, a rim or tire part B, and a side part C having a central opening to receive said hub, and openings corresponding to the projections $p$ to receive said projections, said projections being adapted to be headed down and secure the parts together when said parts are assembled, substantially as and for the purposes set forth.

In witness whereof I have hereunto set my hand and seal, at Indianapolis, Indiana, this 15th day of November, A. D. 1897.

ROBERT L. DORSEY. [L. S.]

Witnesses:
CHESTER BRADFORD,
JAMES A. WALSH.